United States Patent
Kim et al.

(10) Patent No.: US 12,135,994 B2
(45) Date of Patent: Nov. 5, 2024

(54) ELECTRONIC DEVICE INCLUDING MULTI PROCESSOR AND METHOD FOR OPERATING THE SAME

(71) Applicant: SAMSUNG ELECTRONICS CO., LTD., Suwon-si (KR)

(72) Inventors: Kiljae Kim, Suwon-si (KR); Byungsoo Kwon, Suwon-si (KR); Jaeho Kim, Suwon-si (KR); Daehyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 423 days.

(21) Appl. No.: 17/561,213

(22) Filed: Dec. 23, 2021

(65) Prior Publication Data
US 2022/0300333 A1 Sep. 22, 2022

Related U.S. Application Data

(63) Continuation of application No. PCT/KR2021/017877, filed on Nov. 30, 2021.

(30) Foreign Application Priority Data

Mar. 19, 2021 (KR) .................. 10-2021-0036042

(51) Int. Cl.
G06F 9/50 (2006.01)
G06F 9/4401 (2018.01)

(52) U.S. Cl.
CPC .......... *G06F 9/5027* (2013.01); *G06F 9/4401* (2013.01)

(58) Field of Classification Search
CPC .... G06F 9/5027; G06F 9/4401; G06F 9/5088; G06F 9/4881; G06F 9/505; Y02D 10/00
See application file for complete search history.

(56) References Cited

U.S. PATENT DOCUMENTS 8,533,503 B2 9/2013 Lippett
8,732,439 B2 5/2014 Lippett
(Continued)

FOREIGN PATENT DOCUMENTS

JP 2018-22345 A 2/2018
KR 10-2007-0037427 A 4/2007
(Continued)

OTHER PUBLICATIONS

International Search Report and Written Opinion (PCT/ISA/210, PCT/ISA/220 and PCT/ISA/237) dated Mar. 15, 2022 issued by the International Searching Authority in International Application No. PCT/KR2021/017877.
(Continued)

*Primary Examiner* — Dong U Kim
(74) *Attorney, Agent, or Firm* — Sughrue Mion, PLLC

(57) ABSTRACT

An electronic device includes at least one processor including a first processor and a second processor separate from the first processor, a memory electrically connected to the at least one processor and storing instructions, wherein the at least one processor is further configure to execute the instructions to assign foreground tasks to a boosting foreground control group and a non-boosting foreground control group in response to a user input, based on completion of booting of the electronic device, schedule at least one task assigned to the boosting foreground control group for the first processor, and schedule at least one task assigned to the non-boosting foreground control group for the second processor, and performance of the second processor may be lower than performance of the first processor.

20 Claims, 8 Drawing Sheets

(56) References Cited

U.S. PATENT DOCUMENTS

| | | | |
|---|---|---|---|
| 9,400,518 B2 | 7/2016 | Deshmukh et al. | |
| 9,612,879 B2 | 4/2017 | Matthes et al. | |
| 9,684,787 B2 | 6/2017 | Sridhara et al. | |
| 9,996,398 B2 | 6/2018 | Lee et al. | |
| 10,146,582 B2 | 12/2018 | Kim et al. | |
| 10,725,828 B2 | 7/2020 | Kim et al. | |
| 11,385,935 B2 | 7/2022 | Kim et al. | |
| 2009/0300169 A1* | 12/2009 | Sagar | H04L 67/1095 709/224 |
| 2011/0088041 A1 | 4/2011 | Alameldeen et al. | |
| 2014/0325166 A1* | 10/2014 | Iyigun | G06F 12/14 711/158 |
| 2018/0039523 A1 | 2/2018 | Akamine et al. | |
| 2018/0196695 A1* | 7/2018 | Du | G06F 9/4881 |
| 2018/0357166 A1* | 12/2018 | Yu | G06F 12/02 |
| 2019/0068622 A1* | 2/2019 | Lin | H04L 63/1441 |
| 2019/0108066 A1* | 4/2019 | Kim | G06F 9/4856 |
| 2020/0356416 A1 | 11/2020 | Kim et al. | |

FOREIGN PATENT DOCUMENTS

| | | |
|---|---|---|
| KR | 10-2016-0004152 A | 1/2016 |
| KR | 10-2016-0128751 A | 11/2016 |
| KR | 10-2016-0142853 A | 12/2016 |
| KR | 10-2017-0108636 A | 9/2017 |
| KR | 10-2501240 B1 | 2/2023 |

OTHER PUBLICATIONS

Communication dated Jul. 5, 2024, issued by the European Patent Office in counterpart European Application No. 21931830.0.

Iulian Nita et al., "Efficient threads mapping on multicore architecture," Communications (Comm), 2010 8th International Conference on, IEEE, pp. 53-56, Jun. 2010, XP031827255.

* cited by examiner

ELECTRONIC DEVICE INCLUDING MULTI PROCESSOR AND METHOD FOR OPERATING THE SAME

CROSS REFERENCE TO RELATED APPLICATION(S)

This is a by-pass continuation of PCT/KR2021/017877 filed on Nov. 30, 2021 in the Korean Intellectual Property Office (KIPO) and claims benefit of KR 10-2021-0036042 filed on Mar. 19, 2021 in KIPO, the contents of all of the above are incorporated by reference.

BACKGROUND

1. Field

The disclosure relates to an electronic device including a multi-processor and a method for operating the same.

2. Description of Related Art

With the recent development of processor technology, processors have been developed from a single core-type processor to a multi-core type processor. For example, the multi-core processor may include a plurality of cores. For example, the multi-core processor may simultaneously perform several tasks. For example, each of the cores may process at least one task. The electronic device may efficiently process a plurality of tasks using the plurality of cores.

The electronic device may provide various user interactions. For example, an electronic device 300 may display a user experience (UX)/user interface (UI) in response to a user input. For example, the electronic device 300 may execute an application for providing user interaction. For example, the electronic device 300 may enter an application running in the background in response to a user input or execution of the application.

Tasks related to provision of user interaction may require a lot of computation in a short amount of time. In this case, the multi-core processor may increase a central processing unit (CPU) clock and migrate tasks related to user interaction to a big cluster (or core). Hereinafter, operation of migrating tasks closely related to user interaction may be referred to as boosting.

A method of identifying a task to be boosted to provide user interaction may be described. When boosting a task that does not require a large amount of computation, the number of tasks to be processed in a big cluster increases, and thus schedule contention may be caused. Also, the big cluster may cause large power consumption, resulting in a decrease in current efficiency. Conversely, when a task requiring a large amount of computation is not boosted, the operating performance of the electronic device may decrease.

When all tasks assigned to a foreground control group are boosted to provide user interaction, a schedule delay of an application may occur and unnecessary power consumption may be caused.

SUMMARY

Provided herein is an electronic device including: at least one processor including a first processor and a second processor separate from the first processor, wherein a performance of the second processor is lower than a performance of the first processor; and a memory electrically connected to the at least one processor and storing instructions, wherein the at least one processor is further configure to execute the instructions to: assign foreground tasks to a boosting foreground control group and a non-boosting foreground control group in response to a user input; schedule, based on a completion of a booting of the electronic device, at least one first task assigned to the boosting foreground control group for the first processor; and schedule, based on the completion of the booting of the electronic device, at least one second task assigned to the non-boosting foreground control group for the second processor.

Also provided herein is a method for operating an electronic device including: assigning foreground tasks to a boosting foreground control group and a non-boosting foreground control group in response to a user input; scheduling, based on a completion of booting of the electronic device, at least one first task assigned to the boosting foreground control group for a first processor; and scheduling, based on the completion of booting of the electronic device, at least one second task assigned to the non-boosting foreground control group for a second processor, wherein a second performance of the second processor is lower than a first performance of the first processor.

According to the embodiments disclosed herein, it is possible to prevent a decrease in operating performance of an application and unnecessary power consumption of the electronic device by separately managing boosted tasks when user interaction is provided.

In addition, various effects may be provided that are directly or indirectly understood through the disclosure.

Effects that can be obtained in various embodiments of the disclosure are not limited to the above-mentioned effects, and other effects not mentioned can be understood clearly to those of ordinary skill in the art to which the disclosure belongs from the description below.

BRIEF DESCRIPTION OF THE DRAWINGS

In the description of the drawings, the same or similar reference numerals may be used for the same or similar components.

DETAILED DESCRIPTION

Figure 1:
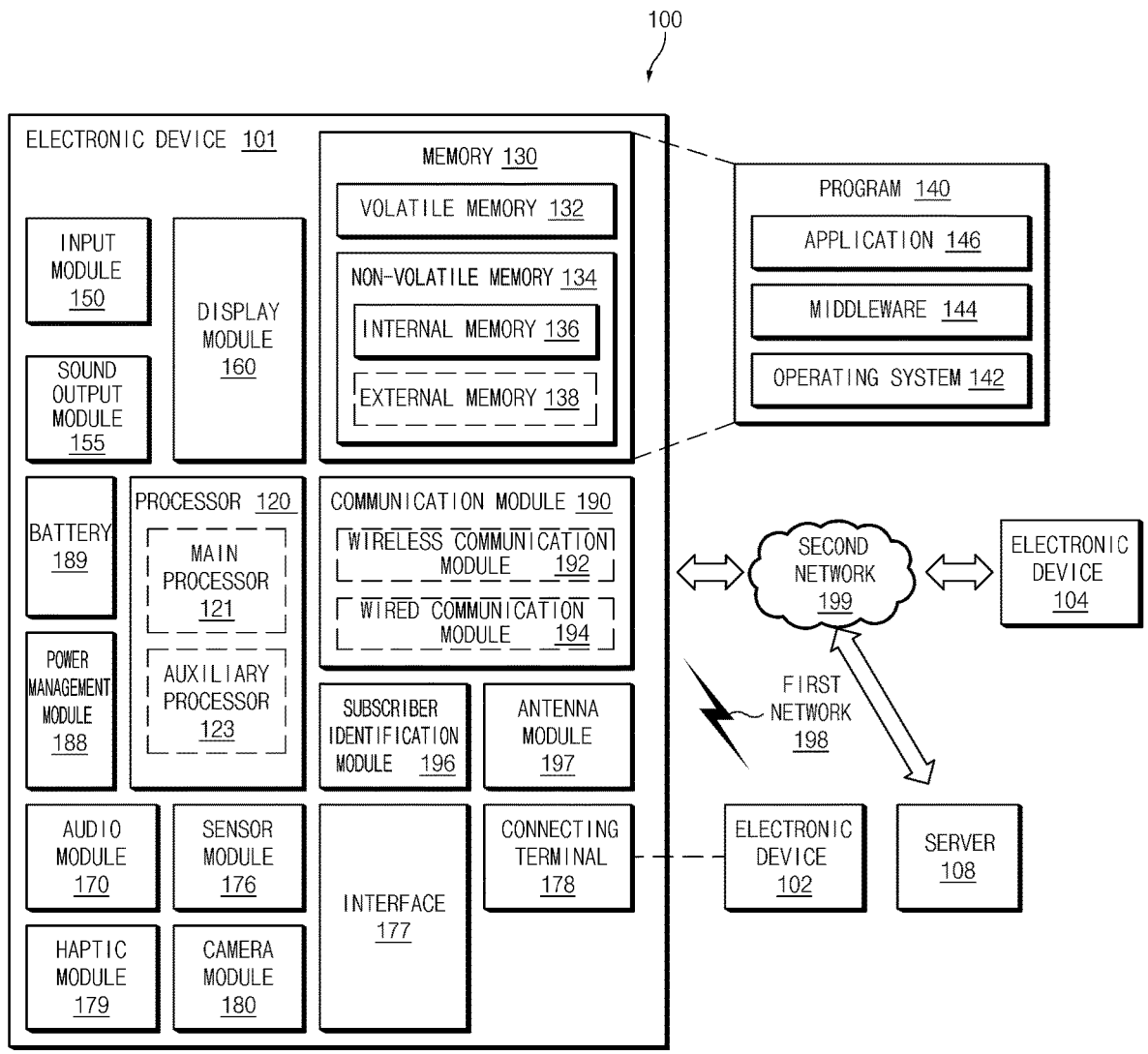
FIG. 1 is a block diagram illustrating an electronic device in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., via wire(s)) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented, for example, as at least part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via wire(s)), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
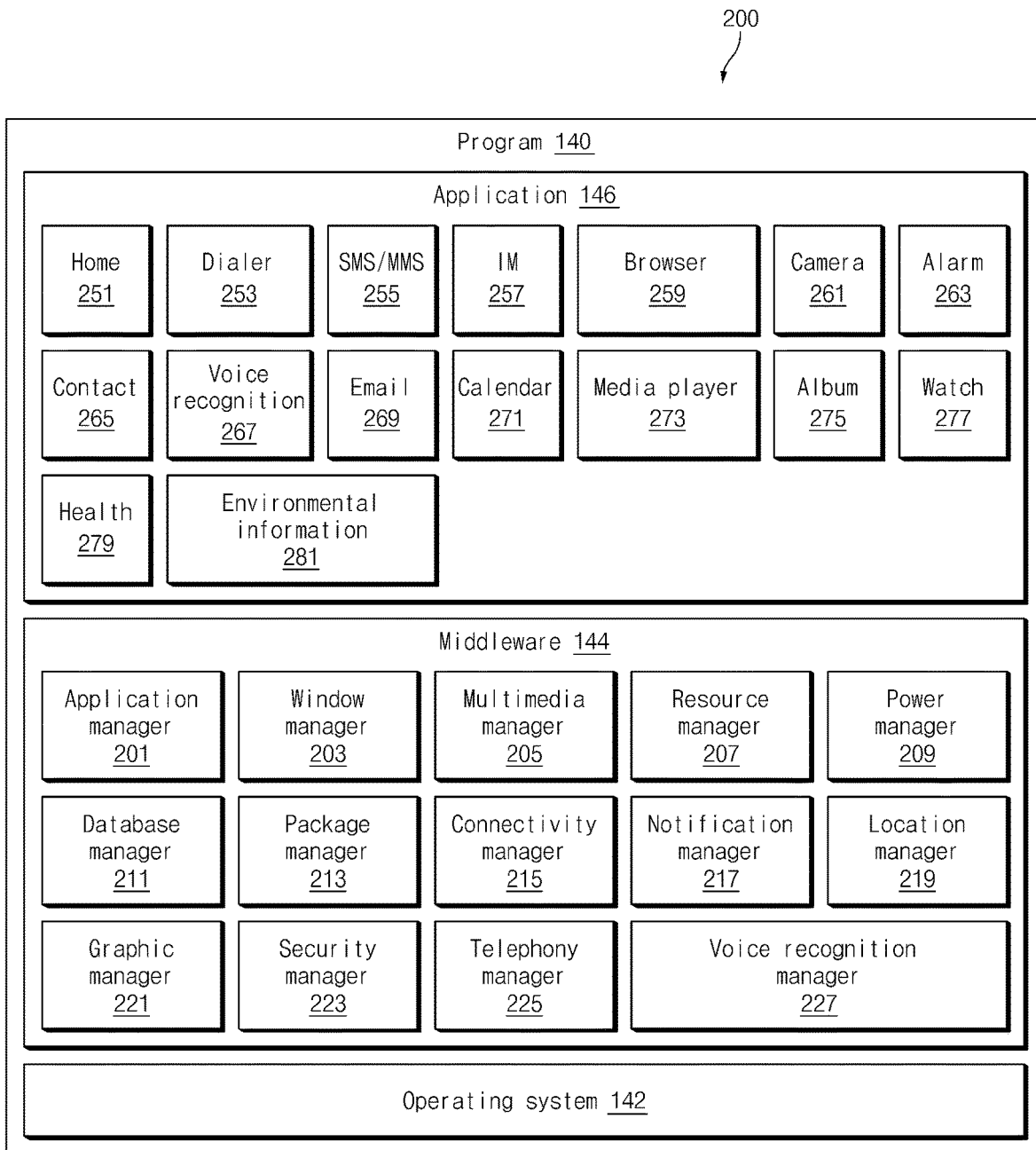
FIG. 2 is a block diagram 200 illustrating the program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
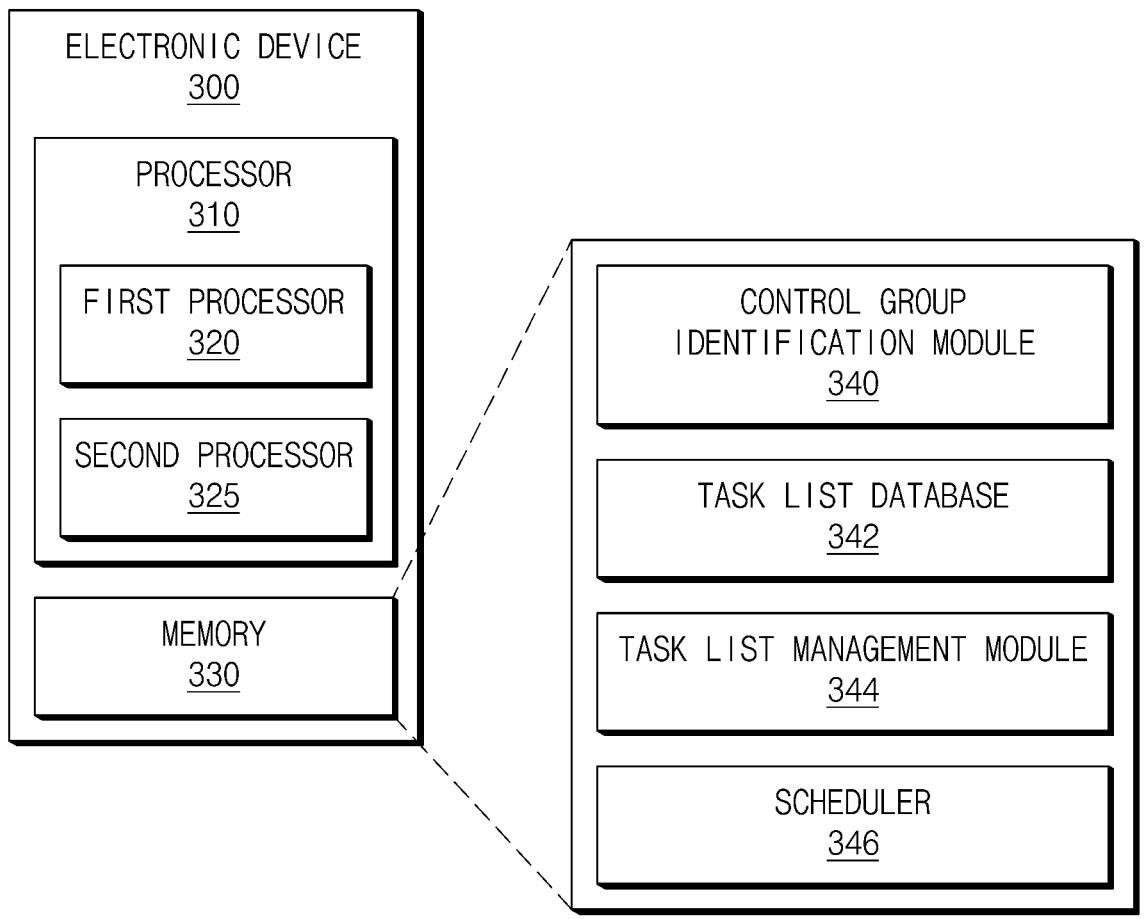
FIG. 3 is a block diagram illustrating a configuration of an electronic device according to an embodiment of the disclosure.
Figure 4:
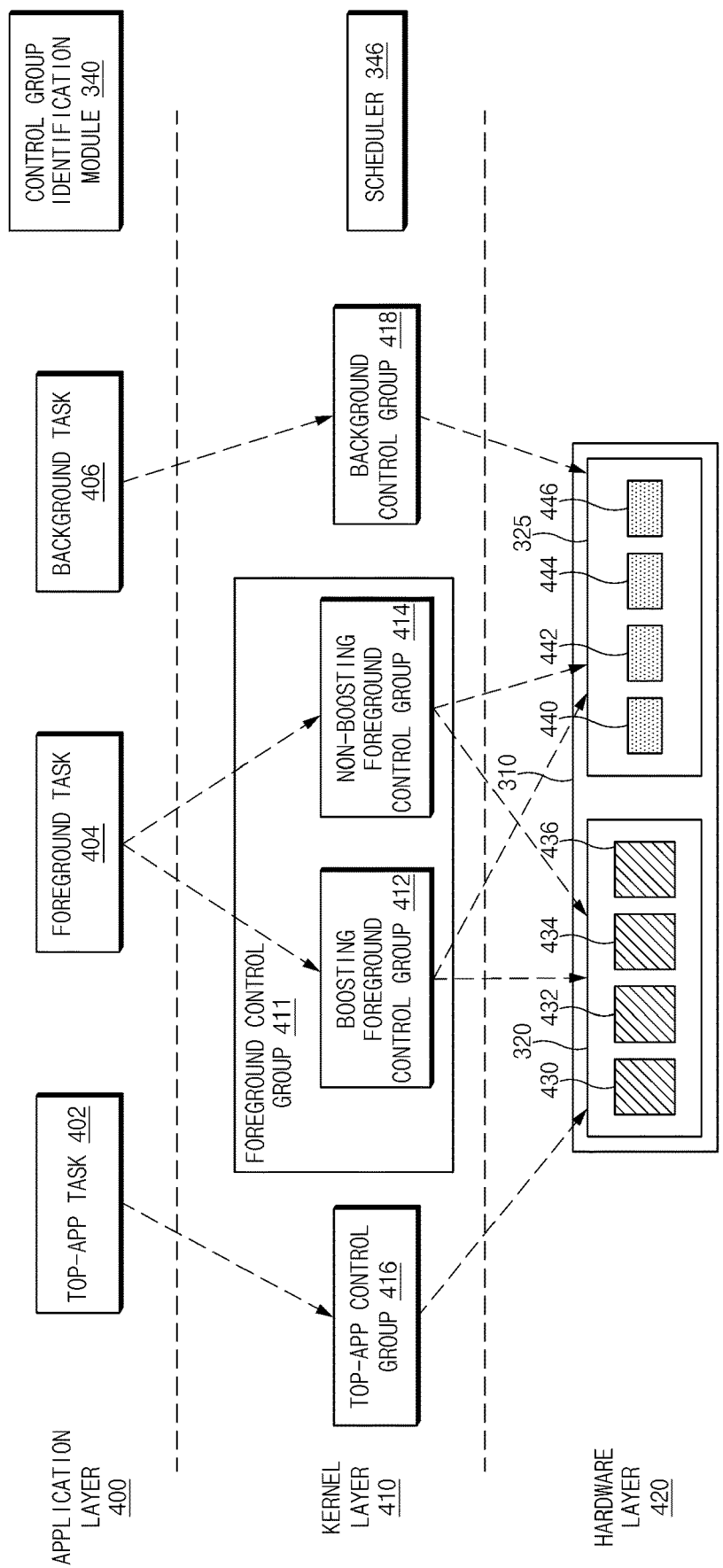
FIG. 4 illustrates a hierarchical structure according to an embodiment of the disclosure.

FIG. 3 is a block diagram illustrating a configuration of an electronic device according to an embodiment of the disclosure. FIG. 4 illustrates a hierarchical structure according to an embodiment of the disclosure.

Referring to FIG. 3, the electronic device 300 may include at least one processor 310 and a memory 330. The at least one processor 310 and the memory 330 may correspond to the processor 120 and the memory 130 of FIG. 1, respectively.

According to an embodiment, the at least one processor 310 may include a first processor 320 and a second processor 325. According to an embodiment, the at least one processor 310 of the electronic device 300 may include a heterogeneous multi-core processor including at least two cores of different types. The multi-core processor may execute a plurality of tasks at the same time. A task may mean a job executed with a certain program area (e.g., codes, variables, stacks, or the like). The task may represent a user's request. For example, the task may mean a minimum unit of scheduling in an embedded system. According to an embodiment, a task-related program being loaded into the memory 330 and executed by the at least one processor 310 may be referred to as a process. The process and the task may mean the same program executed in the electronic device 300 except that they are performed in different layers. Hereinafter, for convenience of description, a 'task' or a 'process' may be collectively referred to as a 'task'.

According to an embodiment, the first processor 320 and the second processor 325 may be classified according to the performance or power consumption level of the processor. For example, the first processor 320 may be a high performance processor, and the second processor 325 may be a low performance processor. As a high-performance processor has a faster processing speed, a task having a higher importance may be more likely to be assigned to the first processor 320. It should be noted that a temperature of the electronic device 300 may increase or battery consumption of the electronic device 300 may be large when the high-performance processor is operating. Accordingly, the first processor 320 may be configured to merely process a minimum number of tasks, and the second processor 325 may be configured to process most tasks.

According to an embodiment, the memory 330 may store a control group identification module 340, a task list database 342, a task list management module 344, and/or a scheduler 346. The control group identification module 340, the task list database 342, the task list management module 344, and the scheduler 346 will be described in detail with reference to FIG. 4 below.

Referring to FIG. 4, the electronic device 101 may include an application layer 400, a kernel layer 410, and/or a hardware layer 420. According to an embodiment, tasks related to an application (e.g., the application 146 of FIG. 1 or FIG. 2) may be located in the application layer 400. According to an embodiment, at least some tasks among tasks related to middleware (e.g., middleware 144 of FIG. 1 or FIG. 2) may be located in the application layer 400. According to an embodiment, at least some tasks among tasks related to an operating system (e.g., the operating system 142 of FIG. 1 or FIG. 2) may be located in the application layer 400. According to an embodiment, at least some tasks among the tasks related to the middleware 144 may be located in the kernel layer 410. According to an embodiment, at least some tasks among the tasks related to the operating system 142 may be located in the kernel layer 410. According to an embodiment, at least one hardware component (e.g., the processor 310 and/or the memory 310) of the electronic device 300 may be located in the hardware layer 420.

According to an embodiment, tasks of the application layer 400 may be classified as top-app tasks 402, foreground tasks 404, and/or background tasks 406. The top-app tasks 402 may include a task related to an application used by a user. The foreground tasks 404 may include a task (or process) with a high execution frequency in a framework (e.g., the application 146 and the middleware 144 of FIG. 2). According to an embodiment, the foreground tasks 404 may include a task called by the top-app task 402 among the tasks. Alternatively, the foreground tasks 404 may include a task (or process) developed by a developer as a foreground service. The background tasks 406 may include a task (or process) with a low execution frequency in the framework (e.g., the application 146 and the middleware 144 of FIG. 2). According to an embodiment, the background tasks 406 may include a task that is not related to the top-app task 402 among the tasks. Alternatively, the background tasks 406 may include a task (or process) terminated by the user.

Although the control group identification module 340 is illustrated as being included in the application layer 400 in FIG. 4, the control group identification module 340 may be included in the application layer 400 or the kernel layer 410 according to another embodiment. According to still another embodiment, the control group identification module 340 may be implemented as a part of the scheduler 346.

The kernel layer 410 may include a control group. The control group may refer to a module capable of managing hardware resources of the electronic device 300 in units of control groups. For example, the control group may include a foreground control group 411, a top-app control group 416, and/or a background control group 418.

The hardware layer 420 may include the at least one processor 310. According to an embodiment, the at least one processor 310 may include the first processor 320 and the second processor 325 including different types of cores. For example, the first processor 320 may include at least one big core 430, 432, 434, or 436. The second processor 325 may include at least one little core 440, 442, 444, or 446. For example, the at least one big core 430, 432, 434, or 436 may have a higher computing capability than the at least one little core 440, 442, 444, or 446. According to an embodiment, a clock speed of the first processor 320 may be higher than a clock speed of the second processor 325. A core having the higher performance may be referred to as a "big core", and a core having the lower performance may be referred to as a "little core".

Although the at least one processor 310 is illustrated in FIG. 4 as being an octa-core in which the sum of the first processor 320 and the second processor 325 is eight for convenience of description, embodiments of the disclosure are not limited thereto. For example, the first processor 320 and the second processor 325 may be composed of any one of a dual-core, a triple-core, a quad-core, a hexacore, or an octa-core.

Hereinafter, a task list management operation of the electronic device 300 will be described with reference to the configurations shown in FIGS. 3 and 4.

According to an embodiment, the at least one processor 310 may execute an application in response to a user input. According to another embodiment, an application may be executed by the application itself according to a preset condition. According to another embodiment, the at least one processor 310 may enter an application running in the background in response to the user input.

According to an embodiment, in the electronic device 300 supporting a multi-window, the user input may be associated with any one of a plurality of applications executed through the multi-window. In this case, the at least one processor 310 may perform the following operations for an application in which the user input is received among the plurality of applications.

According to an embodiment, the task list management module 344 may store a default task list in the task list database 342 in response to execution (or entrance) of the application. According to another embodiment, the task list management module 344 may update the task list stored in the task list database 342 in response to execution (or entrance) of the application. For example, the task list management module 344 may update the task list stored in the task list database 342 based on properties of the application. Here, the task list may correspond to some of the tasks included in the foreground tasks 404.

According to an embodiment, the default task list may be previously-set based on entrance (or execution) of the application and responsiveness to the user input. For example, the default task list may include at least one of a system-server main looper, a system-server binder thread, an activitymanager main looper, a process start main looper, 32/64 bit zygote, an OOM (out of memory) update thread, an android UI thread, an android display thread, an android animation thread, a database (DB) provider, an application having a visible layer, a codec provider, and/or a camera HAL (hardware abstraction layer) service/server. However, the above-described tasks are only an example, and the tasks included in the default task list are not limited thereto.

The system-server main looper may include a main handler task that processes messages in a system-server process for managing an operating system (e.g., Android). The system-server binder thread may include a thread for performing a binder call in a system-server when another process requests the binder call from the system-server. The activitymanager main looper may include a main handler task for processing messages from an activity manager that manages activity of each process. The process start main looper may include a task for processing a process on the system-server when the process is started. The 32/64 bit zygote may include an initial process for forking a process. Each process executed in the electronic device 300 may be performed by copying a zycote processor. The OOM update thread may manage a priority for terminating an application process for memory management in the case of insufficient memory space. For example, the lower the priority value of the application process, the higher the likelihood that the application may be terminated. For example, the higher the priority value of the application process, the lower the likelihood that the application may be terminated. The Android user interface (UI) thread may include a thread that performs an operation of drawing a UI in the system-server. The Android display thread may include a thread that performs an operation of configuring a display in the system-server. The Android animation thread may include a thread that performs an operation of drawing an animation in the system-server. The database provider may include a process of providing or managing a database used by media-related files (e.g., photos, videos, music) and/or calendars stored in the electronic device 300. An application having a visible layer may include a running process that draws a UI associated with the application. In an embodiment, in the electronic device 300 supporting a multi-window, there may be a plurality of applications having a visible layer. The codec provider may include an operating system (e.g., Android)-based service for performing conversion of a compression format of an image and/or an image file. The camera HAL service/server may include an operating system (e.g., Android)-based service that performs a camera operation.

Hereinafter, an operation of assigning a control group in the electronic device 300 will be described with reference to the configurations of FIGS. 3 to 4.

According to an embodiment, the control group identification module 340 may assign a process group of the application layer 400 to a control group. For example, the control group identification module 340 may assign the foreground task 404 to the foreground control group 411. For example, the control group identification module 340 may assign the top-app task 402 to the top-app control group 416. For example, the control group identification module 340 may assign the background task 406 to the background control group 418.

According to an embodiment, the control group identification module 340 may assign some of the foreground tasks 404 to a boosting foreground control group 412 in response to the execution (or entry) of an application. For example, the control group identification module 340 may assign some of the foreground tasks 404 to the boosting foreground control group 412 based on a task list stored in the task list database 342. For example, the control group identification module 340 may assign the remaining foreground task 404 to a non-boosting foreground control group 414 except for some foreground tasks 404 assigned to the boosting foreground control group 412.

According to an embodiment, when at least one task assigned to the boosting foreground control group 412 is not processed by a high-performance processor (e.g., at least one big core 430, 432, 434, or 436), the operation of an application may be delayed. For example, a system-server main loop, and/or an Android animation thread may be assigned to the boosting foreground control group 412.

According to an embodiment, even when at least one task assigned to the non-boosting foreground control group 414 is not processed by a high-performance processor (e.g., at least one big core 430, 432, 434, or 436), the operation of an application may not be delayed. For example, a system UI, a launcher, and/or a google mobile service (GMS) may be assigned to the non-boosting foreground control group 414.

According to an embodiment, the control group (e.g., the boosting foreground control group 412, the non-boosting foreground control group 414, the top-app control group 416, and/or the background control group 418) may include settings for assigned tasks. For example, the boosting foreground control group 412 may include settings associated with whether to boost at least one assigned task.

Hereinafter, a scheduling operation of the electronic device 300 will be described with reference to the components of FIGS. 3 to 4.

According to an embodiment, the scheduler 346 may manage schedules of control groups in the kernel layer 410 (e.g., the boosting foreground control group 412, the non-boosting foreground control group 414, the top-app control group 416, and/or the background control group 418).

According to an embodiment, the scheduler 346 may schedule (or assign) at least one task for the first processor 320 or the second processor 325 based on control group settings. For example, a task scheduled for the first processor 320 may be processed by the first processor 320. For example, a task scheduled for the second processor 325 may be processed by the second processor 325.

According to an embodiment, the scheduler 346 may schedule the top-app tasks 402 for the first processor 320 based on the control group settings of the top-app control group 416. When a load of the first processor 320 is equal to or greater than a threshold value, the scheduler 346 may schedule some of the top-app tasks 402 for the second processor 325.

According to an embodiment, the scheduler 346 may schedule the background tasks 406 for the second processor 325 based on the control group settings of the background control group 418.

According to an embodiment, the scheduler 346 may schedule the foreground tasks 404 for the first processor 320 or the second processor 325 based on control group settings of the boosting foreground control group 412 and the non-boosting foreground control group 414.

Figure 5:
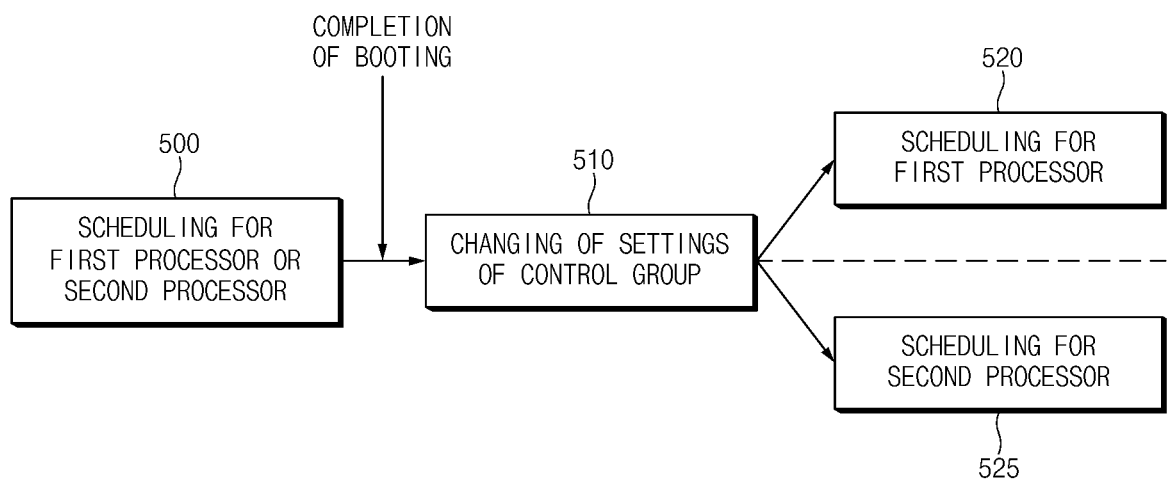
FIG. 5 is a block diagram for describing a boosting operation according to an embodiment of the disclosure.

FIG. 5 is a block diagram for describing a boosting operation according to an embodiment of the disclosure.

According to an embodiment, the at least one processor 310 may differently set control group settings of the boosting foreground control group 412 and the non-boosting foreground control group 414 based on whether the booting of the electronic device 300 has been completed.

Before the booting has been completed, the foreground task 404 may require a lot of computation to secure booting performance of the electronic device 300.

In operation 500, the scheduler 346 may schedule the foreground tasks 404 for the first processor 320 or the second processor 325. For example, the scheduler 346 may schedule the foreground task 404 for the first processor 320. When the load of the first processor 320 is equal to or greater than the threshold value, the scheduler 346 may schedule some of the foreground tasks 404 for the second processor 325. In operation 500, the foreground tasks 404 may be treated in the same manner regardless of control groups (e.g., the boosting foreground control group 412, the non-boosting foreground control group 414).

In operation 510, the at least one processor 310 may change settings of the control group (e.g., the boosting foreground control group 412 and the non-boosting foreground control group 414) based on completion of the booting of the electronic device 300.

According to an embodiment, the at least one processor 310 may change the settings of the boosting foreground control group 412 to a first state. For example, the at least one processor 310 may change a value of a subsystem (e.g., CPUSET) of the boosting foreground control group 412. According to another embodiment, the settings of the boosting foreground control group 412 may be understood as the first state before the booting of the electronic device 300 is completed.

According to an embodiment, the first state may be understood as a state in which a task corresponding to the control group is capable of being processed by the first processor 320 and/or the second processor 325. Alternatively, the first state may be understood as a state in which the control group is capable of being boosted.

According to an embodiment, the at least one processor 310 may change the settings of the non-boosting foreground control group 414 to a second state. For example, the at least one processor 310 may change a value of a subsystem (e.g., CPUSET) of the non-boosting foreground control group 414.

According to an embodiment, the second state may be understood as a state in which a task corresponding to the control group is capable of being processed only by the second processor 325. Alternatively, the second state may be understood as a state in which the control group is not capable of being boosted.

Although not shown in FIG. 5, the settings of the top-app control group 416 may be understood as the first state, and the settings of the background control group 418 may be understood as the second state.

According to an embodiment, the scheduler 346 may boost the boosting foreground control group 412 in response to the execution (or entry) of the application.

According to an embodiment, the at least one processor 310 may execute an application or enter an application in response to a user input. According to another embodiment, the application may be executed by the application itself according to a preset condition. According to another embodiment, the at least one processor 310 may enter an application running in the background in response to the user input.

According to an embodiment, the control group identification module 340 may assign some of the foreground tasks 404 to the boosting foreground control group 412 and assign the remaining foreground tasks 404 to the non-boosting foreground control group 414 in response to the execution (or entry) of an application.

According to an embodiment, the scheduler 346 may schedule at least one task assigned to the boosting foreground control group 412 for the first processor 320 (operation 520). According to an embodiment, some of the at least one task assigned to the boosting foreground control group 412 may be migrated from the second processor 325 to the first processor 320.

According to an embodiment, when a load of the first processor 320 is equal to or greater than a threshold value, the scheduler 346 may schedule some of at least one task assigned to the boosting foreground control group 412 for the second processor 325 (operation 525).

According to an embodiment, the scheduler 346 may schedule at least one task assigned to the non-boosting foreground control group 414 for the second processor 325. For example, the scheduler 346 may schedule at least one task assigned to the non-boosting foreground control group 414 for the second processor 325 together with a change in the settings of the control group (operation 525). For another example, the scheduler 346 may schedule at least one task assigned to the non-boosting foreground control group 414 for the second processor 325 in response to the execution (or entry) of the application (operation 525). According to an embodiment, at least some of tasks assigned to the non-boosting foreground control group 414 may be migrated from the first processor 320 to the second processor 325.

Hereinafter, a scheduling operation in a case where there are a plurality of applications having a visible layer will be described.

According to an embodiment, in the electronic device 300 supporting a multi-window, the at least one processor 310 may execute a plurality of applications through the multi-window. In this case, there may be a plurality of applications having a visible layer.

According to an embodiment, the at least one processor 310 may receive a user input for any one of a plurality of applications executed through the multi-window. The application which has received the user input may have focus.

According to an embodiment, tasks related to a plurality of applications having a visible layer may be assigned to the boosting foreground control group 412. According to an embodiment, the scheduler 346 may schedule tasks related to the plurality of applications for the first processor 320 in response to the execution (or entry) of the application.

According to an embodiment, when the load of the first processor 320 is equal to or greater than the threshold value, the scheduler 346 may schedule tasks related to the remaining applications except applications having focus among the plurality of applications for the second processor 325. For example, an application which has received a user input among the plurality of applications may be an application having focus.

According to an embodiment, the electronic device 300 may include at least one processor 310 including the first processor 320 and the second processor 325 separate from the first processor 320 and the memory 330 electrically connected to the at least one processor 310 to store a foreground control group (foreground Cgroup) 411 and instructions. The instructions, when executed by the at least one processor 310, may cause the electronic device 300 to, in response to a user input, assign the foreground tasks 404 into the boosting foreground control group 412 and the non-boosting foreground control group 414, schedule at least one task assigned to the boosting foreground control group 412 for the first processor 320 based on the completion of booting of the electronic device 300, and schedule at least one task assigned to the non-boosting foreground control group 414 for the second processor 325. According to an embodiment, the performance of the second processor 325 may be lower than the performance of the first processor 320. According to an embodiment, the first processor 320 may include at least one big core, and the second processor 325 may include at least one little core.

According to an embodiment, the instructions, when executed by the at least one processor 310, may cause the electronic device 300 to change settings of the boosting foreground control group 412 and the non-boosting foreground control group 414 based on the completion of the booting of the electronic device 300.

According to an embodiment, the instructions, when executed by the at least one processor 310, may cause the electronic device 300 to migrate some of at least one task corresponding to the boosting foreground control group 412 from the second processor 325 to the first processor 320 when scheduling the at least one task assigned to the boosting foreground control group 412 for the first processor 320.

According to an embodiment, the instructions, when executed by the at least one processor 310, may cause the electronic device 300 to migrate some of at least one task corresponding to the non-boosting foreground control group 414 from the first processor 320 to the second processor 325 when scheduling the at least one task assigned to the non-boosting foreground control group 414 for the second processor 325.

According to an embodiment, the instructions, when executed by the at least one processor 310, may cause the electronic device 300 to store a default task list in the memory 330 in response to a user input, and assign some of the foreground tasks 404 to the boosting foreground control group 412 based on the default task list.

According to an embodiment, the memory 330 may further store the default task list and the instructions, when executed by the at least one processor 310, may cause the electronic device 300 to enter an application in response to a user input, update the default task list based on the properties of the application, and assign some of the foreground tasks 404 to the boosting foreground control group 412 based on the updated task list. According to an embodiment, the properties of the application may include at least one of whether the application uses a database, whether the application is a 32-bit application, whether the application has a visible layer, whether the application uses a codec, or whether the application uses a camera.

According to an embodiment, the instructions, when executed by the at least one processor 310, may cause the electronic device 300 to schedule some of at least one task assigned to the boosting foreground control group 412 for the second processor 325 when the load of the first processor 320 is greater than or equal to a threshold value.

According to an embodiment, the instructions, when executed by the at least one processor 310, may cause the electronic device 300 to schedule a top-app task for the first processor 320 when scheduling the at least one task assigned to the boosting foreground control group 412 for the first processor 320.

Figure 6:
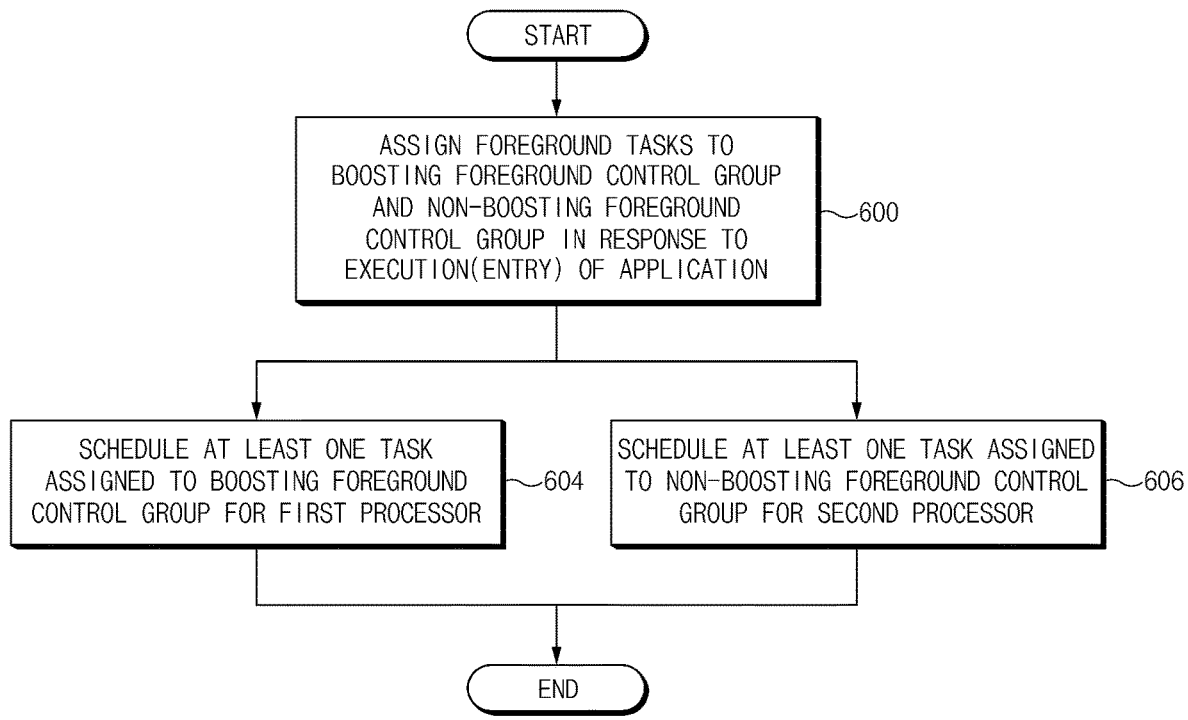
FIG. 6 is a flowchart for describing an operation of an electronic device according to an embodiment of the disclosure.

FIG. 6 is a flowchart for describing an operation of an electronic device according to an embodiment of the disclosure.

For description with reference to FIG. 6, the configurations of FIGS. 2 to 5 may be referred to. Hereinafter, it may be understood that operations of the control group identification module 340, the task list management module 344, and the scheduler 346 are substantially performed by the at least one processor 310.

Operation 600 to operation 606 may be understood as operations after the booting of the electronic device 300 has been completed.

In operation 600, the control group identification module 340 may assign the foreground tasks 404 to the boosting foreground control group 412 and the non-boosting foreground control group 414 in response to the execution (or entry) of an application.

According to an embodiment, the at least one processor 310 may execute an application or enter an application in response to a user input. According to another embodiment, the application may be executed by the application itself according to a preset condition. According to another embodiment, the at least one processor 310 may enter an application running in the background in response to the user input.

According to an embodiment, the control group identification module 340 may allocate some of the foreground tasks 404 to the boosting foreground control group 412 based on a task list stored in the task list database 342. According to an embodiment, the control group identification module 340 may allocate the remaining foreground task 404 to the non-boosting foreground control group 414 except for some foreground tasks 404 allocated to the boosting foreground control group 412.

In operation 604, the scheduler 346 may boost the boosting foreground control group 412 based on control group settings of the boosting foreground control group 412. According to an embodiment, the settings of the boosting foreground control group 412 may be a first state.

In operation 604, the scheduler 346 may schedule at least one task assigned to the boosting foreground control group 412 for the first processor 320. According to an embodiment, some of the at least one task assigned to the boosting foreground control group 412 may be migrated from the second processor 325 to the first processor 320. According to an embodiment, when a load of the first processor 320 is equal to or greater than a threshold value, the scheduler 346 may schedule some of at least one task assigned to the boosting foreground control group 412 for the second processor 325.

In operation 606, the scheduler 346 may schedule at least one task assigned to the non-boosting foreground control group 414 for the second processor 325. In an embodiment, the settings of the non-boosting foreground control group 414 may be the second state. According to an embodiment, at least some of tasks assigned to the non-boosting foreground control group 414 may be migrated from the first processor 320 to the second processor 325.

Figure 7A:
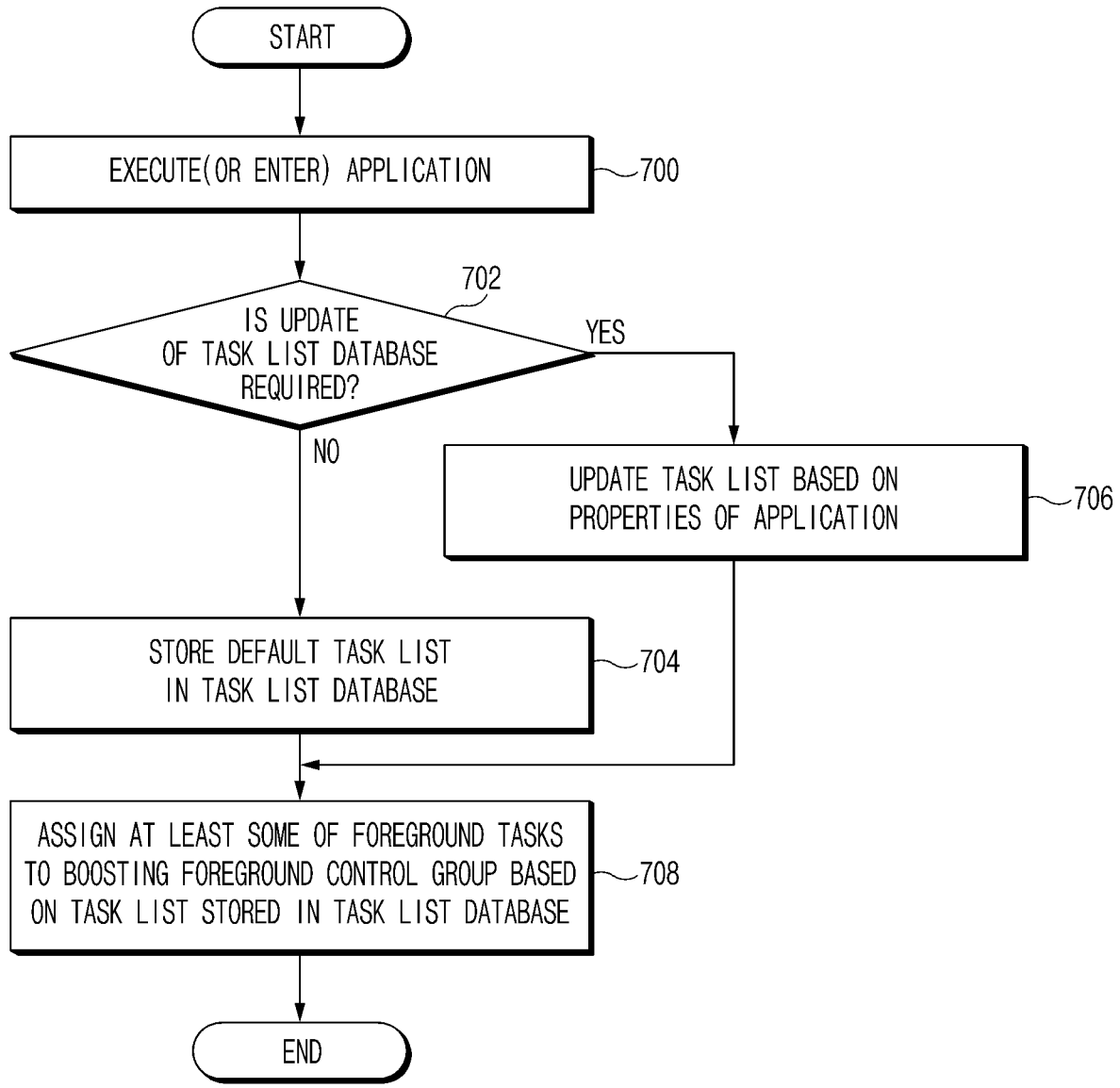
FIG. 7A is a flowchart for describing an operation of assigning a boosting foreground control group according to an embodiment of the disclosure.

FIG. 7A 7A is a flowchart for describing an operation of assigning a boosting foreground control group according to an embodiment of the disclosure.

For description with reference to FIG. 7A, the configurations of FIGS. 2 to 5 may be referred to. Hereinafter, it may be understood that operations of the control group identification module 340, the task list management module 344, and the scheduler 346 are substantially performed by at least one processor 310.

Operation 700 to operation 708 may be understood to correspond to operation 600 of FIG. 6.

In operation 700, the at least one processor 310 may identify execution (or entry) of an application.

In operation 702, the task list management module 344 may determine whether update of the task list database 342 used in the executed application is required.

When the update of the task list database 342 is not required (702-NO), the task list management module 344 may proceed to operation 704. For example, a case where the update of the task list database 342 is not required may include a case where there is no task list stored in the task list database 342 or a case where the application is executed for the first time after being updated.

In operation 704, the task list management module 344 may store the default task list in the task list database 342. For example, the default task list may include at least one of a system-server main looper, a system-server binder thread, an activitymanager main looper, a process start main looper, 32/64 bit zygote, an OOM (out of memory) update thread, an android UI thread, an android display thread, an android animation thread, a database (DB) provider, an application having a visible layer, a codec provider, and/or a camera HAL (hardware abstraction layer) service/server.

When the update of the task list database 342 is required (702-YES), the task list management module 344 may proceed to operation 706. The case where the update of the task list database 342 is required may include a case where a task list is stored in the task list database 342.

In operation 706, the task list management module 344 may update the task list stored in the task list database 342 based on properties of the application. For description for update of the task list, reference may be made to the description with reference to FIG. 7B.

In operation 708, the control group identification module 340 may allocate some of the foreground tasks 404 to the boosting foreground control group 412 based on a task list stored in the task list database 342.

Figure 7B:
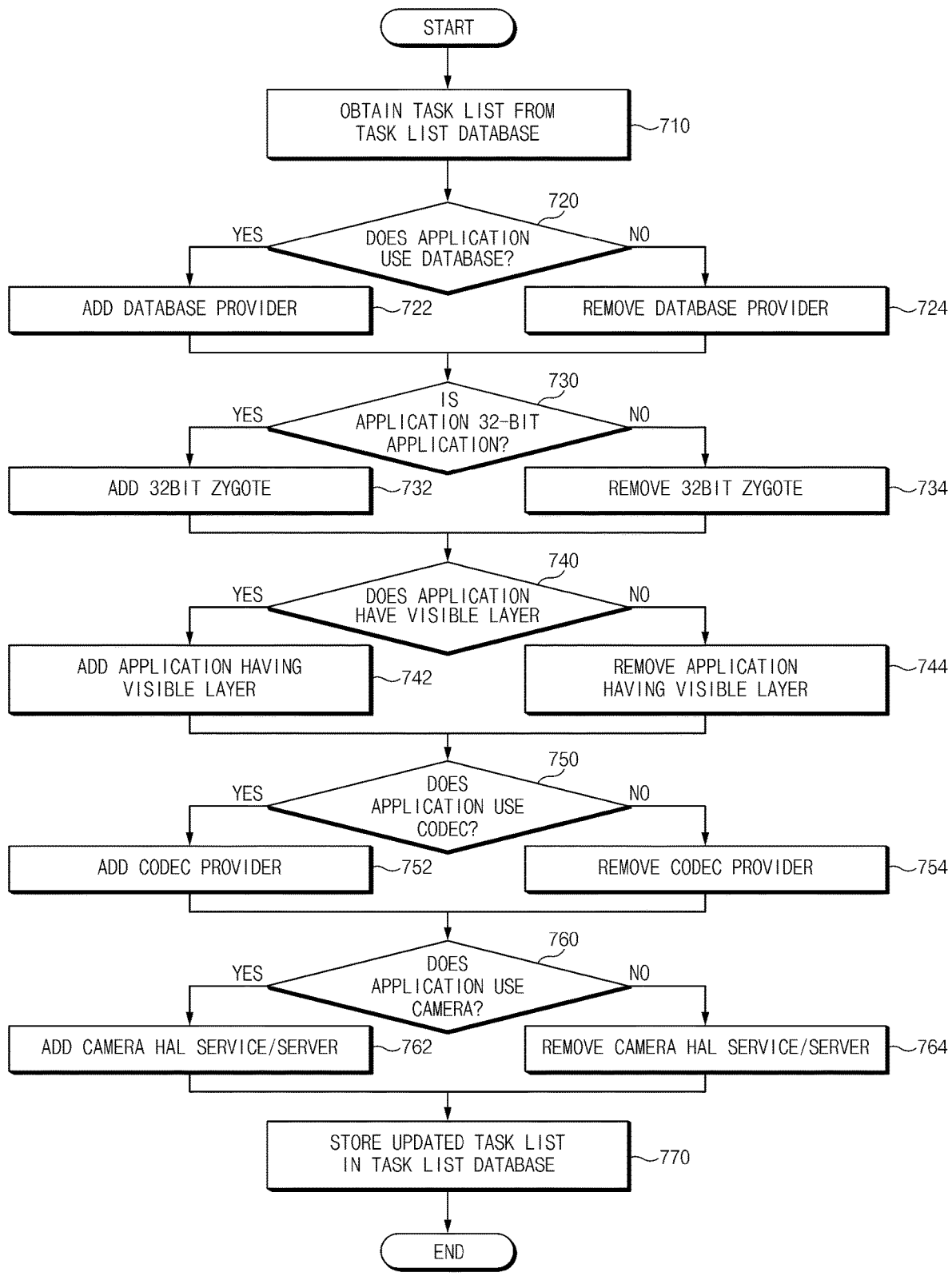
FIG. 7B is a flowchart for describing update of a task list according to an embodiment of the disclosure.

FIG. 7B is a flowchart for describing update of a task list according to an embodiment of the disclosure.

For the description with reference to FIG. 7B, the configurations of FIGS. 2 to 5 may be referred to. Hereinafter, it may be understood that operations of the task list management module 344 are substantially performed by the at least one processor 310.

Although operation 710 to operation 750 are illustrated as being sequentially performed in FIG. 7B, they may be performed simultaneously or in an arbitrary order by changing the order. The operations of FIG. 7B may be understood to correspond to the operations 706 of FIG. 7A.

In operation 710, the task list management module 344 may obtain a task list stored in the task list database 342 from the task list database 342.

In operation 720, the task list management module 344 may determine whether an application uses the database.

When the application uses the database (720-YES), the task list management module 344 may maintain a database provider included in the task list or add a database provider to the task list (722).

When the application does not use the database (720-NO) and the database provider is included in the task list, the task list management module 344 may delete the database provider from the task list (724).

In operation 730, the task list management module 344 may determine whether the application is a 32-bit application.

When the application is the 32-bit application (730-YES), the task list management module 344 may maintain a 32-bit zygote included in the task list or add a 32-bit zygote to the task list (732).

When the application is not a 32-bit application (730-NO) and the 32-bit zygote is included in the task list, the task list management module 344 may delete the 32-bit zygote from the task list (734).

In operation 740, the task list management module 344 may determine whether the application has a visible layer.

When the application has a visible layer (740-YES), the task list management module 344 may maintain an application having a visible layer included in the task list or add an application having a visible layer to the task list (742).

When the application does not have a visible layer (740-NO) and the application having a visible layer is included in the task list, the task list management module 344 may delete the application having a visible layer from the task list (744).

In operation 750, the task list management module 344 may determine whether the application uses a codec.

When the application uses a codec (750-YES), the task list management module 344 may maintain a codec provider included in the task list or add a codec provider to the task list (752).

When the application does not use a codec (750-NO) and the codec provider is included in the task list, the task list management module 344 may delete the codec provider from the task list (754).

In operation 760, the task list management module 344 may determine whether the application uses a camera.

When the application uses a camera (760-YES), the task list management module 344 may maintain a camera HAL service/server or add a camera HAL service/server to the task list (762).

When the application does not use a camera (760-NO) and the camera HAL service/server is included in the task list, the task list management module 344 may delete the camera HAL service/server from the task list (764).

In operation 770, the task list management module 344 may store the updated task list in the task list database 342.

What is claimed is:

1. An electronic device comprising:
   at least one processor including a first processor and a second processor that is separate from the first processor, wherein a performance of the second processor is lower than a performance of the first processor; and
   memory electrically connected to the at least one processor and storing instructions,
   wherein the instructions that, when executed by the at least one processor individually or collectively, cause the electronic device to:
   assign at least one first task to a boosting foreground control group and assign at least one second task to a non-boosting foreground control group in response to a user input, wherein a plurality of foreground tasks comprises the at least one first task and the at least one second task;
   schedule, based on a completion of a booting of the electronic device, the at least one first task assigned to the boosting foreground control group for the first processor; and schedule, based on the completion of the booting of the electronic device, the at least one second task assigned to the non-boosting foreground control group for the second processor, wherein before the booting of the electronic device has been completed, schedule the at least one first task and the at least one second task.

2. The electronic device of claim 1, wherein the first processor, includes a first core which is a high performance core in comparison with a second core included in the second processor.

3. The electronic device of claim 1, wherein the instructions that, when executed by the at least one processor individually or collectively, cause the electronic device to change settings of the boosting foreground control group and the non-boosting foreground control group based on the completion of the booting of the electronic device.

4. The electronic device of claim 1, wherein the instructions that, when executed by the at least one processor individually or collectively, cause the electronic device to migrate some of the at least one first task corresponding to the boosting foreground control group from the second processor to the first processor when the electronic device schedules the at least one first task assigned to the boosting foreground control group for the first processor.

5. The electronic device of claim 1, wherein the instructions that, when executed by the at least one processor individually or collectively, cause the electronic device to migrate some of the at least one second task corresponding to the non-boosting foreground control group from the first processor to the second processor when the electronic device schedules the at least one second task assigned to the non-boosting foreground control group for the second processor.

6. The electronic device of claim 1, wherein the instructions that, when executed by the at least one processor individually or collectively, cause the electronic device to:

store a default task list in the memory in response to the user input, and assign some of the plurality of foreground tasks to the boosting foreground control group based on the default task list.

7. The electronic device of claim 1, wherein the memory further stores a default task list, and wherein the instructions that, when executed by the at least one processor individually or collectively, cause the electronic device to:

enter an application in response to the user input, update the default task list based on properties of the application, and assign some of the plurality of foreground tasks to the boosting foreground control group based on the updated default task list.

8. The electronic device of claim 7, wherein the properties of the application include at least one of whether the application uses a database, whether the application is a 32-bit application, whether the application has a visible layer, whether the application uses a codec, or whether the application uses a camera.

9. The electronic device of claim 1, wherein the instructions that, when executed by the at least one processor individually or collectively, cause the electronic device to schedule some of the at least one first task assigned to the boosting foreground control group for the second processor when a load of the first processor is equal to or greater than a threshold value.

10. The electronic device of claim 1, wherein the instructions that, when executed by the at least one processor individually or collectively, cause the electronic device to schedule a top-app task for the first processor when the at least one first task assigned to the boosting foreground control group is scheduled for the first processor.

11. A method for operating an electronic device, the method comprising:

assigning at least one first task to a boosting foreground control group and assigning at least one second task to a non-boosting foreground control group in response to a user input, wherein a plurality of foreground tasks comprises the at least one first task and the at least one second task;

scheduling, based on a completion of booting of the electronic device, the at least one first task assigned to the boosting foreground control group for a first processor; and scheduling, based on the completion of booting of the electronic device, the at least one second task assigned to the non-boosting foreground control group for a second processor, wherein a performance of the second processor is lower than a performance of the first processor, wherein before the booting of the electronic device has been completed, scheduling the at least one first task and the at least one second task.

12. The method of claim 11, wherein the first processor includes a first core which is a high performance core in comparison with a second core included in the second processor.

13. The method of claim 11, further comprising:

changing settings of the boosting foreground control group and the non-boosting foreground control group based on the completion of the booting of the electronic device.

14. The method of claim 11, wherein the scheduling of the at least one first task assigned to the boosting foreground control group for the first processor includes migrating some of the at least one first task corresponding to the boosting foreground control group from the second processor to the first processor.

15. The method of claim 11, wherein the scheduling of the at least one second task assigned to the non-boosting foreground control group for the second processor includes migrating some of the at least one second task corresponding to the non-boosting foreground control group from the first processor to the second processor.

16. The method of claim 11, further comprising:

storing a default task list in response to the user input; and assigning some of the plurality of foreground tasks to the boosting foreground control group based on the default task list.

17. The method of claim 11, further comprising:

entering an application in response to the user input;

updating a default task list based on properties of the application; and assigning some of the plurality of foreground tasks to the boosting foreground control group based on the updated default task list.

18. The method of claim 17, wherein the properties of the application include at least one of whether the application uses a database, whether the application is a 32-bit application, whether the application has a visible layer, whether the application uses a codec, or whether the application uses a camera.

19. The method of claim 11, further comprising:
scheduling some of the at least one first task assigned to the boosting foreground control group for the second processor when a load of the first processor is equal to or greater than a threshold value.

20. The method of claim 11, wherein the scheduling of the at least one first task assigned to the boosting foreground control group for the first processor includes scheduling a top-app task for the first processor.

* * * * *